US011228352B2

(12) United States Patent
Tang (10) Patent No.: US 11,228,352 B2
(45) Date of Patent: Jan. 18, 2022

(54) WIRELESS COMMUNICATION METHOD, TERMINAL DEVICE AND NETWORK DEVICE

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 202 days.

(21) Appl. No.: 16/483,295

(22) PCT Filed: Feb. 13, 2017

(86) PCT No.: PCT/CN2017/073369
§ 371 (c)(1),
(2) Date: Aug. 2, 2019

(87) PCT Pub. No.: WO2018/145313
PCT Pub. Date: Aug. 16, 2018

(65) Prior Publication Data
US 2020/0014442 A1    Jan. 9, 2020

(51) Int. Cl.
*H04B 7/06* (2006.01)
*H04W 24/10* (2009.01)
(Continued)

(52) U.S. Cl.
CPC ......... *H04B 7/0617* (2013.01); *H04B 7/0695* (2013.01); *H04W 24/10* (2013.01); *H04W 68/005* (2013.01); *H04W 72/046* (2013.01)

(58) Field of Classification Search
CPC ... H04B 7/0617; H04B 7/0695; H04W 24/10; H04W 68/005; H04W 72/046
See application file for complete search history.

(56) References Cited

U.S. PATENT DOCUMENTS 6,980,530 B2 * 12/2005 Reddy .................. H04L 49/901
370/316
9,054,766 B2    6/2015 Cho et al.
(Continued)

FOREIGN PATENT DOCUMENTS

CN    102282885 A    12/2011
CN    103688474 A     3/2014
(Continued)

OTHER PUBLICATIONS

India First Examination for IN Application 201917035186 filed Dec. 15, 2020.
(Continued)

*Primary Examiner* — Deepa Belur
(74) *Attorney, Agent, or Firm* — Young Basile Hanlon & MacFarlane, P.C.

(57) ABSTRACT

A wireless communication method, a terminal device, and a network device are provided. The method includes: a terminal device determines a plurality of transmitting beams from transmitting beams of a network device, and determines a receiving beam matched with each transmitting beam of the plurality of transmitting beams in at least two receiving beam groups of the terminal device; and the terminal device transmits a notification message to the network device, wherein the notification message is used for indicating the plurality of transmitting beams and the receiving beam matched with the each transmitting beam, and includes information to be used by the network device for distinguishing a receiving beam group to which the receiving beam matched with the each transmitting beam belongs and distinguishing the receiving beam matched with the transmitting beam in the receiving beam group.

18 Claims, 5 Drawing Sheets

(51) Int. Cl.
*H04W 68/00* (2009.01)
*H04W 72/04* (2009.01)

(56) References Cited

U.S. PATENT DOCUMENTS

| | | | |
|---|---|---|---|
| 9,287,944 B2 | 3/2016 | Shapira | |
| 9,661,592 B2* | 5/2017 | Seol | H04W 52/24 |
| 10,897,717 B2* | 1/2021 | Fukui | H04W 74/08 |
| 2003/0157932 A1* | 8/2003 | Chitrapu | H04L 67/04 |
| | | | 455/423 |
| 2013/0057432 A1* | 3/2013 | Rajagopal | H01Q 3/26 |
| | | | 342/368 |
| 2013/0223251 A1 | 8/2013 | Li et al. | |
| 2015/0312864 A1 | 10/2015 | Jung | |
| 2016/0105230 A1 | 4/2016 | Sidiropoulos et al. | |
| 2016/0359533 A1 | 12/2016 | Obara et al. | |
| 2019/0349031 A1* | 11/2019 | Xiang | H04W 72/046 |

FOREIGN PATENT DOCUMENTS

| | | | |
|---|---|---|---|
| CN | 103733540 A | 4/2014 | |
| CN | 103875191 A | 6/2014 | |
| CN | 103891161 A | 6/2014 | |
| CN | 104734758 A | 6/2015 | |
| CN | 104937972 A | 9/2015 | |
| CN | 105308881 A | 2/2016 | |
| CN | 106031066 A | 10/2016 | |
| CN | 106374984 A | 2/2017 | |
| EP | 3076722 A1 | 10/2016 | |
| GB | 2559424 A * | 8/2018 | H04W 24/10 |
| JP | 2009200824 A | 9/2009 | |
| RU | 2439803 C1 | 1/2012 | |
| WO | 2016184214 A1 | 11/2016 | |
| WO | WO-2018025070 A1 * | 2/2018 | H04B 7/0617 |

OTHER PUBLICATIONS

Canada First Office Action for CA Application 3,052,874 dated Nov. 12, 2020.
Design and Realization of Multibea Communication Device Based on Air-ground Communication; Ren Peng; Mar. 2015; 79 pages.
3GPP TSG RAN1 86b; Reno, NV, Nov. 14-18, 2016; R1-1612056.
3GPP TSG RAN WG1 #87; Reno, USA Nov. 14-18, 2016; R1-1612517.
3GPP TSG RAN WG1 Meeting #87; Reno, USA Nov. 14-18, 2016; R1-1611385.
3GPP TSG RAN WG1 Meeting #86; Gothenburg, Sweden, Aug. 22-26, 2016; R1-166089.
English translation of RU Notice of Allowance dated Apr. 24, 2020.
English Translation of First Chinese Office Action dated May 25, 2020 from Application No. 201780085154.7.
Extended EP Search Report for EP 17896101.7 dated Nov. 21, 2019; 15 pages.
Second Office Action and English Translation of CN Application 201780085154.7 dated Aug. 12, 2020.
First Written Opinion and English Translation of SG 11201907187V dated Aug. 2020.
Communication pursuant to Article 94(3) for EP Application 17896101.7 dated Jul. 23, 2020.
Extended European Search Report for EP Application 21154602.3 dated Apr. 12, 2021. (16 pages).
Singapore Notice of Eligibility for Grant for SG Application 11201907187V dated Jun. 2, 2021. (6 pages).

* cited by examiner

A terminal device determines multiple transmitting beams from transmitting beams of a network device, and determines a receiving beam matched with each transmitting beam of the multiple transmitting beams in at least two receiving beam groups of the terminal device — 210

The terminal device transmits a notification message to the network device, wherein the notification message is used for indicating the multiple transmitting beams and the receiving beam matched with the each transmitting beam, and includes information to be used by the network device for distinguishing a receiving beam group to which the receiving beam matched with the each transmitting beam belongs and distinguishing the receiving beam matched with the transmitting beam in the receiving beam group — 220

A network device receives a notification message transmitted by a terminal device, wherein the notification message is used for indicating multiple transmitting beams used by the network device and a receiving beam matched with each transmitting beam of the multiple transmitting beams in at least two receiving beam groups of the terminal device, and the notification message includes information to be used by the network device for distinguishing a receiving beam group to which the receiving beam matched with the each transmitting beam belongs and distinguishing the receiving beam matched with the transmitting beam in the receiving beam group — 310

The network device determines a beam group to which the receiving beam matched with the each transmitting beam belongs and determines the receiving beam matched with the each transmitting beam according to the notification message — 320

Determine multiple target transmitting beams from the multiple transmitting beams according to the beam group to which the receiving beam matched with the each transmitting beam belongs and the receiving beam matched with the each transmitting beam — 330

The network device transmits simultaneously downlink signals to the terminal device by using the multiple target transmitting beams — 340

WIRELESS COMMUNICATION METHOD, TERMINAL DEVICE AND NETWORK DEVICE

CROSS-REFERENCE TO RELATED APPLICATION(S)

This application is a 371 application of International Application No. PCT/CN2017/073369, filed on Feb. 13, 2017, the entire disclosure of which is hereby incorporated by reference.

TECHNICAL FIELD

The present disclosure relates to the field of communication, and more particularly to a wireless communication method, a terminal device, and a network device.

BACKGROUND

In a multi-beam system, a network device may use multiple transmitting beams to transmit downlink signals to a terminal device, and the terminal device may use matched receiving beams to receive the downlink signals transmitted by the multiple transmitting beams.

However, matched beams of different downlink transmitting beams of the network device may correspond to different receiving beams of the terminal device, and the network device needs to learn matched receiving beams of the downlink transmitting beams to better select transmitting beams for transmitting signals to the terminal device.

How the network device learns information of receiving beams matched with downlink transmitting beams and then selects appropriate transmitting beams is an urgent problem to be solved.

SUMMARY

Implementations of the present disclosure provide a wireless communication method, a terminal device, and a network device.

In a first aspect, a wireless communication method is provided. The method includes: a terminal device determines multiple transmitting beams from transmitting beams of a network device, and determines a receiving beam matched with each transmitting beam of the multiple transmitting beams in at least two receiving beam groups of the terminal device; and the terminal device transmits a notification message to the network device, wherein the notification message is used for indicating the multiple transmitting beams and the receiving beam matched with the each transmitting beam, and includes information to be used by the network device for distinguishing a receiving beam group to which the receiving beam matched with the each transmitting beam belongs and distinguishing the receiving beam matched with the transmitting beam in the receiving beam group.

In combination with the first aspect, in one possible implementation of the first aspect, in the at least two receiving beam groups, different receiving beam groups correspond to different antenna panels of the terminal device.

In combination with the first aspect or any of the above-mentioned possible implementations of the first aspect, in another possible implementation of the first aspect, the notification message carries identification information of the receiving beam matched with the each transmitting beam, and the identification information of each receiving beam carried by the notification message is different from identification information of other receiving beams included in the at least two receiving beam groups, to be used by the network device for distinguishing the receiving beam group to which the receiving beam matched with the each transmitting beam belongs and distinguishing the receiving beam matched with the transmitting beam in the receiving beam group.

In combination with the first aspect or any of the above-mentioned possible implementations of the first aspect, in another possible implementation of the first aspect, the notification message carries identification information of the receiving beam group to which the receiving beam matched with the each transmitting beam belongs, and identification information of the receiving beam matched with the each transmitting beam in the receiving beam group to which the receiving beam belongs, to be used by the network device for distinguishing the receiving beam group to which the receiving beam matched with the each transmitting beam belongs and distinguishing the receiving beam matched with the transmitting beam in the receiving beam group.

In combination with the first aspect or any of the above-mentioned possible implementations of the first aspect, in another possible implementation of the first aspect, the multiple transmitting beams include multiple first transmitting beams, a receiving beam matched with the multiple first transmitting beams is a first receiving beam, and the first receiving beam is one receiving beam included in one of the at least two receiving beam groups.

The method further includes: the terminal device receives downlink signals simultaneously transmitted by the network device through the multiple first transmitting beams, by using the first receiving beam.

In combination with the first aspect or any of the above-mentioned possible implementations of the first aspect, in another possible implementation of the first aspect, before the downlink signals simultaneously transmitted by the network device through the multiple first transmitting beams are received by using the first receiving beam, the method further includes: the terminal device receives first indication information, wherein the first indication information is used for indicating that the network device will simultaneously transmit the downlink signals to the terminal device by using the multiple first transmitting beams.

In combination with the first aspect or any of the above-mentioned possible implementations of the first aspect, in another possible implementation of the first aspect, receiving beams matched with the multiple transmitting beams are multiple receiving beams, and different receiving beams in the multiple receiving beams belong to different receiving beam groups.

The method further includes: the terminal device receives simultaneously downlink signals simultaneously transmitted by the network device through the multiple transmitting beams, by using multiple receiving beams.

In combination with the first aspect or any of the above-mentioned possible implementations of the first aspect, in another possible implementation of the first aspect, before the downlink signals simultaneously transmitted by the network device through the multiple transmitting beams are received simultaneously by using the multiple receiving beams, the method further includes: the terminal device receives second indication information, wherein the second indication information is used for indicating that the network device will simultaneously transmit the downlink signals to the terminal device by using the multiple transmitting beams.

In combination with the first aspect or any of the above-mentioned possible implementations of the first aspect, in another possible implementation of the first aspect, determining, by the terminal device, multiple transmitting beams from the transmitting beams of the network device and determining, by the terminal device, the receiving beam matched with the each transmitting beam of the multiple transmitting beams in the at least two receiving beam groups of the terminal device, includes: the terminal device measures downlink measurement signals transmitted by at least part of the transmitting beams of the network device by using at least part of receiving beams of each of the at least two receiving beam groups to obtain a measurement result; and the terminal device determines the multiple transmitting beams and the receiving beam matched with the each transmitting beam of the multiple transmitting beams in the at least two receiving beam groups according to the measurement result.

In combination with the first aspect or any of the above-mentioned possible implementations of the first aspect, in another possible implementation of the first aspect, the notification message further carries a measurement result of measuring, by the terminal device, a downlink measurement signal transmitted by the each transmitting beam by using the receiving beam matched with the each transmitting beam of the multiple transmitting beams.

In a second aspect, a wireless communication method is provided. The method includes: a network device receives a notification message transmitted by a terminal device, wherein the notification message is used for indicating multiple transmitting beams of the network device and a receiving beam matched with each transmitting beam of the multiple transmitting beams in at least two receiving beam groups of the terminal device, and the notification message includes information to be used by the network device for distinguishing a receiving beam group to which the receiving beam matched with the each transmitting beam belongs and distinguishing the receiving beam matched with the transmitting beam in the receiving beam group; the network device determines the receiving beam matched with the each transmitting beam and determines a receiving beam group to which the receiving beam matched with the each transmitting beam belongs according to the notification message; the network device determines multiple target transmitting beams from the multiple transmitting beams according to the receiving beam matched with the each transmitting beam and the receiving beam group to which the receiving beam matched with the each transmitting beam belongs; and the network device transmits simultaneously downlink signals to the terminal device by using the multiple target transmitting beams.

In combination with the second aspect, in one possible implementation of the second aspect, different receiving beam groups of the terminal device correspond to different antenna panels of the terminal device.

In combination with the second aspect or any of the above-mentioned possible implementations of the second aspect, in another possible implementation of the second aspect, the notification message carries identification information of the receiving beam matched with the each transmitting beam, and the identification information of each receiving beam carried by the notification message is different from identification information of other receiving beams included in the at least two receiving beam groups; and determining, by the network device, the receiving beam matched with the each transmitting beam and determining the receiving beam group to which the receiving beam matched with the each transmitting beam belongs according to the notification message, includes: the network device determines the receiving beam matched with the each transmitting beam and determines the receiving beam group to which the receiving beam matched with the each transmitting beam belongs according to the identification information of the receiving beam matched with the each transmitting beam and preset information, wherein the preset information is used for indicating receiving beams included in the at least two receiving beam groups.

In combination with the second aspect or any of the above-mentioned possible implementations of the second aspect, in another possible implementation of the second aspect, the notification message carries identification information of the receiving beam group to which the receiving beam matched with the each transmitting beam belongs, and identification information of the receiving beam matched with the each transmitting beam in the receiving beam group to which the receiving beam belongs; determining, by the network device, the receiving beam matched with the each transmitting beam and determining the receiving beam group to which the receiving beam matched with the each transmitting beam belongs according to the notification message, includes: the network device determines the receiving beam matched with the each transmitting beam and determines the receiving beam group to which the receiving beam matched with the each transmitting beam belongs according to the identification information of the receiving beam group to which the receiving beam matched with the each transmitting beam belongs and the identification information of the receiving beam matched with the each transmitting beam in the receiving beam group to which the receiving beam belongs.

In combination with the second aspect or any of the above-mentioned possible implementations of the second aspect, in another possible implementation of the second aspect, the multiple target transmitting beams are matched with multiple receiving beams, and different receiving beams in the multiple receiving beams belong to different receiving beam groups.

In combination with the second aspect or any of the above-mentioned possible implementations of the second aspect, in another possible implementation of the second aspect, the multiple transmitting beams include multiple first transmitting beams, a receiving beam matched with the multiple first transmitting beams is a first receiving beam, and the first receiving beam is one receiving beam included in one of the at least two receiving beam groups.

In combination with the second aspect or any of the above-mentioned possible implementations of the second aspect, in another possible implementation of the second aspect, the method further includes: the network device transmits indication information to the terminal device, wherein the indication information is used for indicating that the network device will simultaneously transmit downlink signals to the terminal device by using the multiple target transmitting beams.

In combination with the second aspect or any of the above-mentioned possible implementations of the second aspect, in another possible implementation of the second aspect, the notification message further carries a measurement result of measuring, by the terminal device, a downlink measurement signal transmitted by the each transmitting beam by using the receiving beam matched with the each transmitting beam of the multiple transmitting beams.

In a third aspect, a terminal device is provided, which may include units for implementing the method in the first aspect or any of the above-mentioned possible implementations of the first aspect.

In a fourth aspect, a network device is provided, which may include units for implementing the method in the second aspect or any of the above-mentioned possible implementations of the second aspect.

In a fifth aspect, a terminal device is provided, which may include a memory and a processor. The memory stores instructions, and the processor is used for invoking the instructions stored in the memory to execute the method in the first aspect or any optional implementation of the first aspect.

In a sixth aspect, a network device is provided, which may include a memory and a processor. The memory stores instructions, and the processor is used for invoking the instructions stored in the memory to execute the method in the second aspect or any optional implementation of the second aspect.

In a seventh aspect, a computer readable medium is provided. The computer readable medium stores program codes for execution by a terminal device, and the program codes include instructions for executing the method in the first aspect or any of various implementations of the first aspect, or include instructions for executing the method in the second aspect or any of various implementations of the second aspect.

In an eighth aspect, a system chip is provided. The system chip includes an input interface, an output interface, a processor, and a memory. The processor is used for executing the codes in the memory, and when the codes are executed, the processor may implement the method in the first aspect or any of various implementations of the first aspect, or implement the method in the second aspect or any of various implementations of the second aspect.

BRIEF DESCRIPTION OF DRAWINGS

To describe technical solutions of implementations of the present disclosure more clearly, accompanying drawings that need to be used in the implementations or description for the prior art will be briefly introduced below. It is apparent that the accompanying drawings described below are only some implementations of the present disclosure; and for a person of ordinary skill in the art, other drawings may be obtained according to these drawings without paying an inventive effort.

DETAILED DESCRIPTION

The technical solutions in the implementations of the present disclosure will be described below with reference to the drawings in the implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solutions of the implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a future 5G system.

Figure 1:
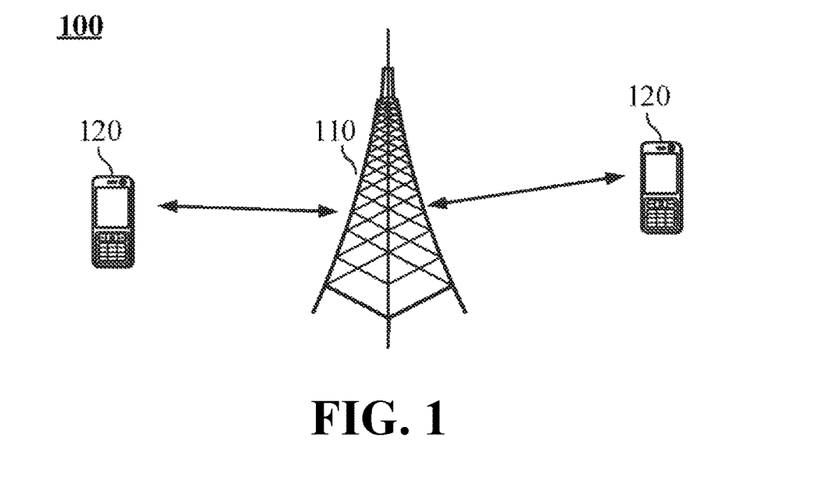
FIG. 1 is a schematic diagram of a wireless communication system according to an implementation of the present disclosure.

FIG. 1 shows a wireless communication system 100 applied in an implementation of the present disclosure. The wireless communication system 100 may include a network device 110. The network device 100 may be a device that communicates with a terminal device. The network device 100 may provide communication coverage for a specific geographical area, and may communicate with a terminal device (e.g., UE) in the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, an on-board device, or a wearable device, a network side device in a future 5G network, or a network device in a future evolved Public Land Mobile Network (PLMN), etc.

The wireless communication system 100 also includes at least one terminal device 120 in the coverage area of the network device 110. The terminal device 120 may be mobile or fixed. Optionally, the terminal device 120 may be referred to as an access terminal, User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a radio modem, an on-board device, a wearable device, a terminal device in a future 5G network, or a terminal device in a future evolved PLMN, or the like.

Optionally, the 5G system or network may also be referred to as a New Radio (NR) system or network.

FIG. 1 exemplifies one network device and two terminal devices. Optionally, the wireless communication system 100 may include multiple network devices, and another quantity of terminal devices may be included within the coverage area of each network device, which is not restricted in implementations of the present disclosure.

Optionally, the wireless communication system 100 may also include other network entities such as a network controller, a mobile management entity, and implementations of the present disclosure are not limited thereto.

It should be understood that the terms "system" and "network" are often used interchangeably in this document. The term "and/or" in this document is merely an association relationship describing an associated object, indicating that there may be three relationships, for example, A and/or B may indicate three cases: A alone, A and B, and B alone. In addition, the symbol "/" in this document generally indicates that objects before and after the symbol "/" have an "or" relationship.

Figure 2:
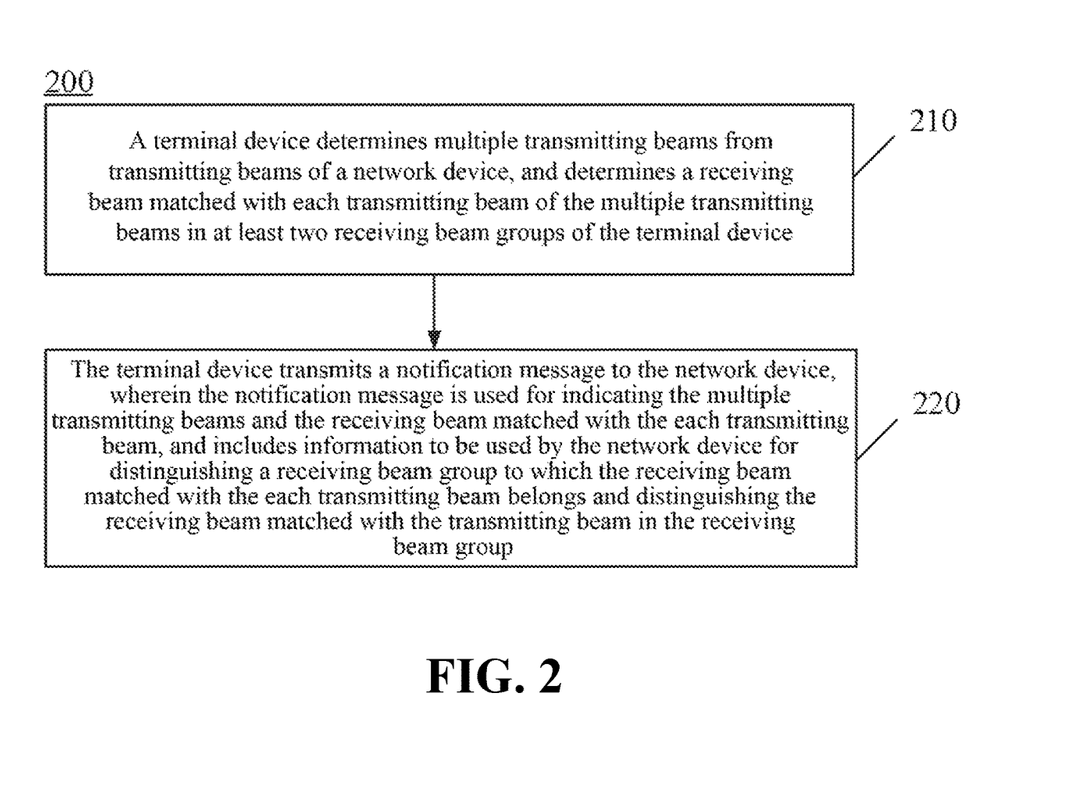
FIG. 2 is a schematic flowchart of a wireless communication method according to an implementation of the present disclosure.

FIG. 2 is a schematic flowchart of a wireless communication method 200 according to an implementation of the present disclosure. The method 200 may optionally be applied to the wireless communication system 100 described above.

As shown in FIG. 2, the method 200 includes the following contents.

In 210, a terminal device determines multiple transmitting beams from transmitting beams of a network device, and determines a receiving beam matched with each transmitting beam of the multiple transmitting beams in at least two receiving beam groups of the terminal device.

Optionally, the transmitting beams of the network device may include beams transmitted through multiple transmitting nodes.

Optionally, in the at least two receiving beam groups, different receiving beam groups correspond to different antenna panels of the terminal device.

Optionally, the terminal device measures downlink measurement signals transmitted by at least part of the transmitting beams of the network device by using at least part of receiving beams of each of the at least two receiving beam groups to obtain a measurement result; and determines the multiple transmitting beams and the receiving beam matched with the each transmitting beam of the multiple transmitting beams in the at least two receiving beam groups according to the measurement result.

Specifically, the terminal device may obtain multiple transmitting beams with the best beam quality according to the measurement result, or may randomly select multiple transmitting beams from beams whose beam quality exceeds a threshold.

Optionally, the downlink measurement signal may be at least one of a synchronization signal, a channel state information reference signal, and a mobility related reference signal.

Optionally, the measurement result may be at least one of a Reference Signal Receiving Power (RSRP), a Reference Signal Receiving Quality (RSRQ), and a Signal to Interference plus Noise Ratio (SINR).

Optionally, the receiving beam matched with the transmitting beam may refer to a receiving beam with the best signal quality for receiving downlink signals transmitted by the transmitting beam through the matched receiving beam.

Optionally, the receiving beam matched with one transmitting beam may be multiple receiving beams, that is, a signal quality for receiving the downlink signals through the multiple receiving beams respectively is higher than that for receiving the downlink signals by other receiving beams in at least two receiving beam groups.

Optionally, the notification message further carries a measurement result of measuring, by the terminal device, a downlink measurement signal transmitted by the each transmitting beam by using the receiving beam matched with the each transmitting beam of the multiple transmitting beams, so that the network device may select the transmitting beams according to the measurement result.

Optionally, in the implementation of the present disclosure, the transmitting beam and one receiving beam matched with the transmitting beam may be referred to as a beam pair.

In 220, the terminal device transmits a notification message to the network device, wherein the notification message is used for indicating the multiple transmitting beams and a receiving beam matched with the each transmitting beam, and includes information to be used by the network device for distinguishing a receiving beam group to which the receiving beam matched with the each transmitting beam belongs and distinguishing the receiving beam matched with the transmitting beam in the receiving beam group.

Optionally, the network device needs to learn a grouping situation of receiving beams matched with multiple transmitting beams selected by the terminal device and whether the receiving beams matched with multiple transmitting beams belong to the same receiving beam, then the terminal device may enable the network device to learn the information through the notification message.

In one implementation, the notification message carries identification information of the receiving beam matched with the each transmitting beam, and the identification information of each receiving beam carried by the notification message is different from identification information of other receiving beams included in the at least two receiving beam groups, and the identification information of each receiving beam is to be used by the network device for distinguishing the receiving beam group to which the receiving beam matched with the each transmitting beam belongs and distinguishing the receiving beam matched with the transmitting beam in the receiving beam group.

In another implementation, the notification message carries identification information of a receiving beam group to which the receiving beam matched with the each transmitting beam belongs, and identification information of the receiving beam matched with the each transmitting beam in the receiving beam group to which the receiving beam belongs, to be used by the network device for distinguishing the receiving beam group to which the receiving beam matched with the each transmitting beam belongs and distinguishing the receiving beam matched with the transmitting beam in the receiving beam group. Identification information of different receiving beams in the same receiving beam group is different.

Optionally, the reason that the network device needs to learn the grouping situation of receiving beams matched with the multiple transmitting beams selected by the terminal device and whether the receiving beams matched with multiple transmitting beams belong to the same receiving beam may be: different receiving beams of one receiving beam group of the terminal device cannot simultaneously receive downlink signals, the receiving beams of different receiving beam groups may simultaneously receive downlink signals, and the same receiving beam may simultaneously receive downlink signals transmitted by multiple transmitting beams. Herein, the received downlink signals may be downlink data signals, or downlink control signals, or the like.

Optionally, in the implementation of the present disclosure, in addition to the above two implementations, the terminal device may further report the grouping situation of the receiving beams matched with multiple transmitting beams selected by the terminal device and whether the receiving beams matched with multiple transmitting beams belong to the same receiving beam in other manners.

For example, the notification message reported by the terminal device may indicate that at least two receiving beams may be combined to correspond to one transmitting beam (that is, the at least two receiving beams belong to different receiving beam groups), and one receiving beam may correspond to multiple transmitting beams.

Optionally, multiple transmitting beams selected by the terminal device include multiple first transmitting beams. Herein, a receiving beam matched with the multiple first transmitting beams is a first receiving beam; and the first receiving beam is one receiving beam included in one of the at least two receiving beam groups. The terminal device may receive downlink signals transmitted simultaneously by the network device through the multiple first transmitting beams by using the first receiving beam.

Optionally, before the terminal device receives the downlink signals transmitted simultaneously by the network device through the multiple first transmitting beams by using the first receiving beam, the terminal device may receive first indication information for indicating that the network device will simultaneously transmit the downlink signals to the terminal device by using the multiple first transmitting beams.

Optionally, the receiving beam matched with multiple transmitting beams is multiple receiving beams, and different receiving beams in the multiple receiving beams belong to different receiving beam groups. The terminal device may receive simultaneously downlink signals transmitted simultaneously by the network device through the multiple transmitting beams by using the multiple receiving beams.

Optionally, before the terminal device receives simultaneously downlink signals transmitted simultaneously by the network device through the multiple transmitting beams by using the multiple receiving beams, the terminal device may receive second indication information for indicating that the network device will simultaneously transmit the downlink signals to the terminal device by using the multiple transmitting beams.

Figure 3:
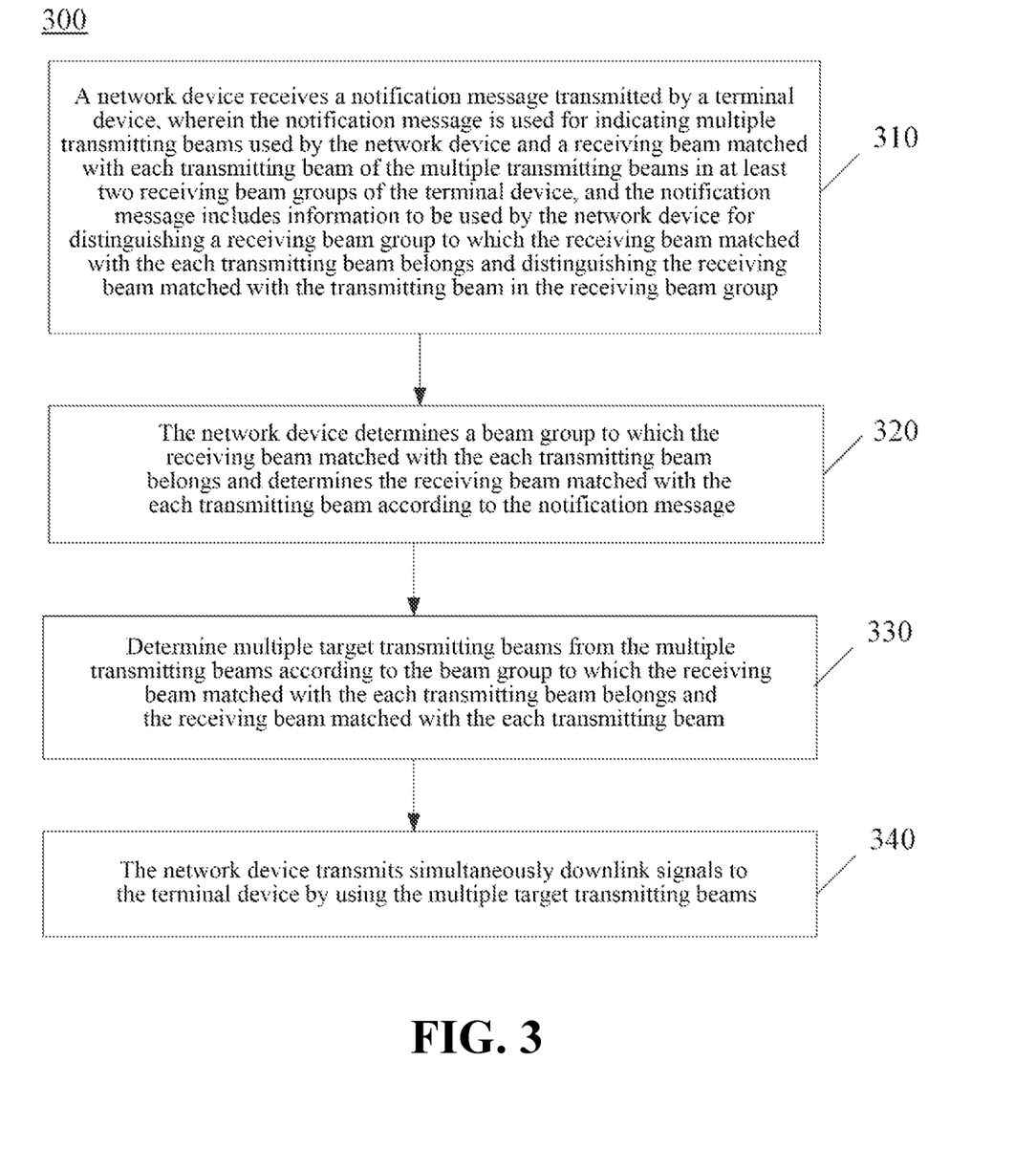
FIG. 3 is a schematic flowchart of a wireless communication method according to an implementation of the present disclosure.

FIG. 3 is a schematic flowchart of a wireless communication method 300 according to an implementation of the present disclosure. As shown in FIG. 3, the method 300 includes the following contents.

In 310, a network device receives a notification message transmitted by a terminal device, wherein the notification message is used for indicating multiple transmitting beams used by the network device and a receiving beam matched with each transmitting beam of the multiple transmitting beams in at least two receiving beam groups of the terminal device, and the notification message includes information to be used by the network device for distinguishing a receiving beam group to which the receiving beam matched with the each transmitting beam belongs and distinguishing the receiving beam matched with the transmitting beam in the receiving beam group.

In 320, the network device determines a beam group to which the receiving beam matched with the each transmitting beam belongs, and determines the receiving beam matched with the each transmitting beam according to the notification message.

Optionally, the notification message carries identification information of the receiving beam matched with the each transmitting beam, and the identification information of each receiving beam carried by the notification message is different from identification information of other receiving beams included in the at least two receiving beam groups.

Then, the network device may determine the beam group to which the receiving beam matched with the each transmitting beam belongs, and determine the receiving beam matched with the each transmitting beam according to the identification information of the receiving beam matched with the each transmitting beam and preset information. Herein the preset information is used for indicating receiving beams included in the at least two receiving beam groups. The network device may determine multiple target transmitting beams from the multiple transmitting beams according to the beam group to which the receiving beam matched with the each transmitting beam belongs and the receiving beam matched with the each transmitting beam.

Optionally, the terminal device may report receiving beams included in each of the at least two receiving beam groups to the network device, so that the network device may preset information.

Optionally, the notification message carries identification information of the receiving beam group to which the receiving beam matched with the each transmitting beam belongs, and identification information of the receiving beam matched with the each transmitting beam in the receiving beam group to which the receiving beam belongs.

Then, the network device may determine the beam group to which the receiving beam matched with the each transmitting beam belongs and determine the receiving beam matched with the each transmitting beam according to the identification information of the receiving beam group to which the receiving beam matched with the each transmitting beam belongs and the identification information of the receiving beam matched with the each transmitting beam in the receiving beam group to which the receiving beam belongs; and determine at least one target receiving beam from the multiple transmitting beams according to the beam group to which the receiving beam matched with the each transmitting beam belongs and the receiving beam matched with the each transmitting beam.

In 330, multiple target transmitting beams are determined from the multiple transmitting beams according to the beam group to which the receiving beam matched with the each transmitting beam belongs and the receiving beam matched with the each transmitting beam.

Optionally, the notification message further carries a measurement result of measuring, by the terminal device, a downlink measurement signal transmitted by the each transmitting beam by using the receiving beam matched with the each transmitting beam of the multiple transmitting beams.

Optionally, the network device may further determine a target transmitting beam from multiple transmitting beams according to at least one of a congestion situation of the each transmitting beam, a data amount of downlink data to be transmitted, and a result for measuring the downlink measurement signal by a beam pair consisted of the each transmitting beam and the receiving beam matched with the each transmitting beam.

Optionally, the multiple target transmitting beams are matched with multiple receiving beams, and different receiving beams in the multiple receiving beams belong to different receiving beam groups, so that the network device transmits simultaneously downlink signals through the multiple target transmitting beams, and the terminal device may simultaneously receive downlink signals through the multiple receiving beams, thereby capable of achieving joint transmission.

Optionally, the multiple transmitting beams include multiple first transmitting beams. Herein, a receiving beam matched with the multiple first transmitting beams is a first receiving beam; and the first receiving beam is one receiving beam included in one of the at least two receiving beam groups. Therefore, the network device may simultaneously transmit downlink signals through the multiple first transmitting beams, and the terminal device may simultaneously receive downlink signals transmitted by the multiple first transmitting beams through the first receiving beam, thereby also capable of achieving joint transmission.

Optionally, in the implementation of the present disclosure, the following implementation may exist, that is, multiple target transmitting beams are matched with multiple receiving beams, and at least two target transmitting beams are matched with one receiving beam.

Optionally, in the implementation of the present disclosure, the network device transmits indication information to the terminal device, wherein the indication information is used for indicating that the network device will simultaneously transmit the downlink signals to the terminal device by using the multiple target transmitting beams.

In 340, the network device simultaneously transmits downlink signals to the terminal device by using the multiple target transmitting beams, so that the terminal device may simultaneously receive the downlink signals transmitted by the network device through the multiple target transmitting beams.

Therefore, in the implementation of the present disclosure, the terminal device indicates the selected multiple transmitting beams and the receiving beam matched with each transmitting beam in the multiple transmitting beams and includes information to be used by the network device for distinguishing a receiving beam group to which the receiving beam matched with the each transmitting beam belongs and distinguishing the receiving beam matched with the transmitting beam in the receiving beam group in the reported notification message. Thus, the network device may not only determine the receiving beam matched with the each transmitting beam, but also determine the receiving beam group to which the receiving beam matched with the each transmitting beam belongs according to the notification message, and further may select a more suitable transmitting beam for transmitting downlink signals to the terminal device in combination with the information of the receiving beam matched with the transmitting beam to obtain greater scheduling freedom. The problem of excessive overhead caused by reporting of any possible combination of receiving beams may be avoided by grouping the receiving beams.

Figure 4:
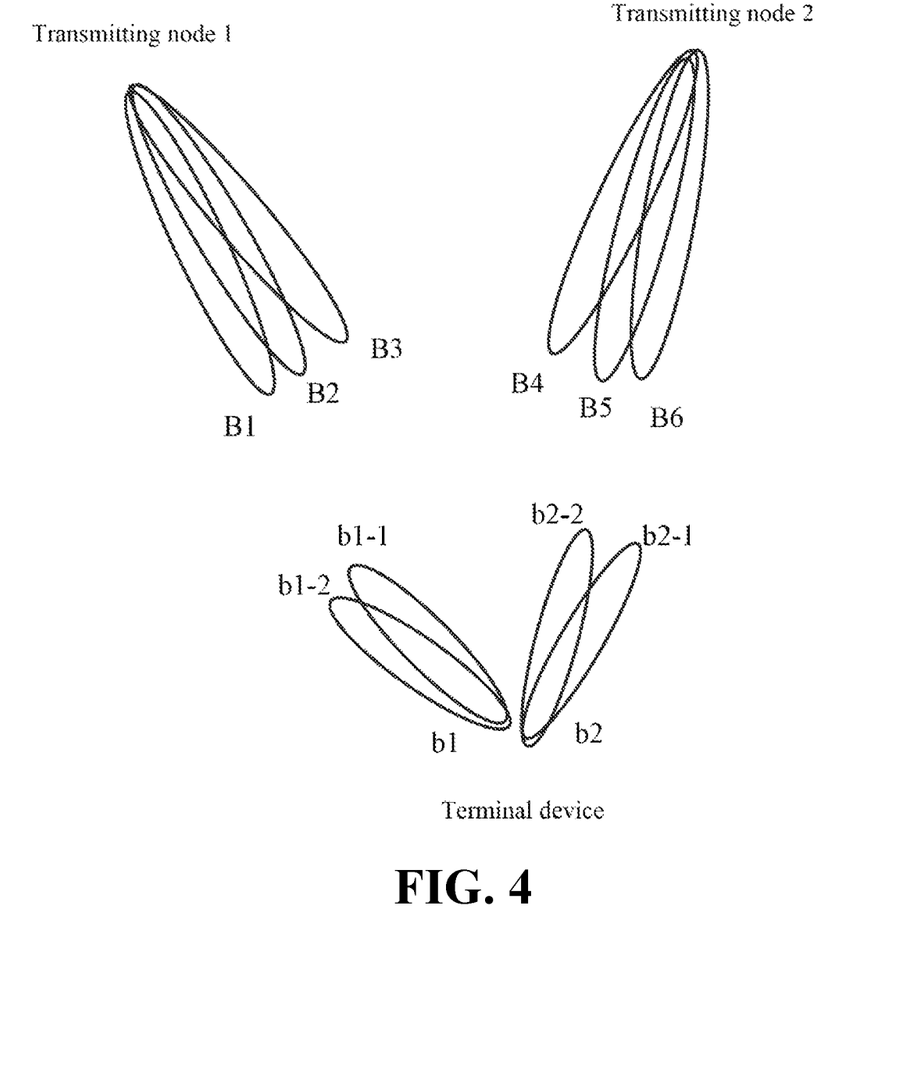
FIG. 4 is a schematic diagram of matching between transmitting beams and receiving beams according to an implementation of the present disclosure.

To understand the present disclosure more clearly, the wireless communication method according to the implementation of the present disclosure will be described below in combination with FIG. 4.

The network device may transmit downlink signals to the terminal device through a transmitting beam B1, a transmitting beam B2, and a transmitting beam B3 of a transmitting node 1, and may transmit downlink signals to the terminal device through a transmitting beam B4, a transmitting beam B5, and a transmitting beam B6 of a transmitting node 2. The terminal device may include two receiving beam groups, namely, a receiving beam group b1 and a receiving beam group b2, wherein the receiving beam group b1 may include receiving beams b1-1 and b1-2, and the receiving beam group b2 may include receiving beams b2-1 and b2-2.

The network device may transmit downlink measurement signals to the terminal device through the transmitting beam B1, the transmitting beam B2, the transmitting beam B3, the transmitting beam B4, the transmitting beam B5, and the transmitting beam B6. The terminal device may measure the downlink signals transmitted by various transmitting beams to obtain a measurement result by using the receiving beams b1-1, b1-2, b2-1, and b2-2. The terminal device may select the transmitting beams according to the measurement result.

For example, the measurement result may be as follows, wherein, assuming the measurement result is RSRP, unlisted beam pairs may be considered as the beam pairs with particularly weak signals and may be ignored.

| | |
|---|---|
| [B1 b1-1] - 60 dB | [B1 b1-2] - 120 dB |
| [B2 b1-1] - 70 dB | [B2 b1-2] - 120 dB |
| [B3 b1-1] - 100 dB | [B3 b1-2] - 120 dB |
| [B4 b2-1] - 120 dB | [B4 b2-2] - 100 dB |
| [B5 b2-1] - 120 dB | [B5 b2-2] - 65 dB |
| [B6 b2-1] - 120 dB | [B6 b2-2] - 75 dB |

If four transmitting beams will be reported, multiple beam pairs may be selected from the above results, and the selected beam pairs and corresponding measurement results may be reported.

Two specific reporting manners will be described below, but it should be understood that the implementations of the present disclosure are not limited thereto.

In one implementation, a specific reporting manner may be as follows:

[B1 b1-1 b1] −60 dB
[B2 b1-1 b1] −70 dB
[B5 b2-2 b2] −65 dB
[B6 b2-2 b2] −75 dB

B1 and b2 may be labels of the receiving beam groups, b1-1 and b1-2 may be a sub-label in the group b1 respectively, and b2-1 and b2-2 may be a sub-label in the group b2 respectively. Herein labels of different receiving beams in a group are different, and labels of receiving beams in different groups may be the same.

If the network device receives the above measurement report, the network device may learn the receiving beam matched with the transmitting beam and the beam group to which the matched receiving beam belongs, that is, the network device may determine whether the receiving beams matched with multiple transmitting beams belong to the same receiving beam, and when it is determined that they do not belong to the same receiving beam, determine whether they belong to the same receiving beam group.

Herein, the receiving beams matched with the transmitting beams selected by the terminal device may belong to different receiving beam groups.

For example, the network device may learn that the receiving beams matched with the transmitting beam B1 and the transmitting beam B6 belong to different receiving beam groups, and then may select B1 and B6 to simultaneously transmit downlink signals to the terminal device.

Or, the network device may learn that the receiving beams matched with the transmitting beam B2 and the transmitting beam B5 belong to different receiving beam groups, and then may select the transmitting beams B2 and B5 to simultaneously transmit downlink signals to the terminal device.

Or, the network device may learn that the receiving beams matched with the transmitting beam B2 and the transmitting beam B6 belong to different receiving beam groups, and then may select the transmitting beams B2 and B6 to simultaneously transmit downlink signals to the terminal device.

Herein, the receiving beams matched with at least two transmitting beams selected by the terminal device may be the same receiving beam of the same receiving beam group.

For example, the network device may learn that the receiving beams matched with the transmitting beam B1 and the transmitting beam B2 belong to the same receiving beam of the same receiving beam group, and then may select B1 and B2 to simultaneously transmit downlink signals to the terminal device.

For example, the network device may learn that the receiving beams matched with the transmitting beam B5 and the transmitting beam B6 belong to the same receiving beam of the same receiving beam group, and then may select B5 and B6 to simultaneously transmit downlink signals to the terminal device.

In another implementation, the network device may preset receiving beams included in each receiving beam group. The specific reporting manner may be as follows:

[B1 b1-1] −60 dB
[B2 b1-1] −70 dB
[B5 b2-2] −65 dB
[B6 b2-2] −75 dB

Identification information of b1-1, b1-2, b2-1, and b2-2 is different from each other.

If the network device receives the above measurement report, in combination with the preset information, the network device may learn the receiving beams matched with the transmitting beams and the beam groups to which the matched receiving beams belong, that is, the network device may determine whether the receiving beams matched with multiple transmitting beams belong to the same receiving beam, and when it is determined that they do not belong to the same receiving beam, determine whether they belong to the same receiving beam group.

Herein, the receiving beams matched with the transmitting beams selected by the terminal device may belong to different receiving beam groups.

For example, the network device may learn that the receiving beams matched with the transmitting beam B1 and the transmitting beam B6 belong to different beam groups, and then may select B1 and B6 to simultaneously transmit downlink signals to the terminal device.

Or, the network device may learn that the receiving beams matched with the transmitting beam B2 and the transmitting beam B5 belong to different beam groups, and then may select the transmitting beams B2 and B5 to simultaneously transmit downlink signals to the terminal device.

Or, the network device may learn that the receiving beams matched with the transmitting beam B2 and the transmitting beam B6 belong to different beam groups, and then may select the transmitting beams B2 and B6 to simultaneously transmit downlink signals to the terminal device.

Herein, the receiving beams matched with transmitting beams selected by the terminal device may be the same receiving beam of the same receiving beam group.

For example, the network device may learn that the receiving beams matched with the transmitting beam B1 and the transmitting beam B2 belong to the same receiving beam of the same receiving beam group, and then may select B1 and B2 to simultaneously transmit downlink signals to the terminal device.

For example, the network device may learn that the receiving beams matched with the transmitting beam B5 and the transmitting beam B6 belong to the same receiving beam of the same receiving beam group, and then may select B5 and B6 to simultaneously transmit downlink signals to the terminal device.

Therefore, in the implementations of the present disclosure, the terminal device indicates the selected multiple transmitting beams and the receiving beam matched with each transmitting beam in the multiple transmitting beams and includes information to be used by the network device for distinguishing a receiving beam group to which the receiving beam matched with the each transmitting beam belongs and distinguishing the receiving beam matched with the transmitting beam in the receiving beam group in the reported notification message. Thus, the network device may not only determine the receiving beam matched with the each transmitting beam, but also determine the receiving beam group to which the receiving beam matched with the each transmitting beam belongs according to the notification message, and further may select a more suitable transmitting beam for transmitting downlink signals to the terminal device in combination with the information of the receiving beam matched with the transmitting beam to obtain a greater scheduling freedom. The problem of excessive overhead caused by reporting of any possible combination of receiving beams may be avoided by grouping the receiving beams.

Figure 5:
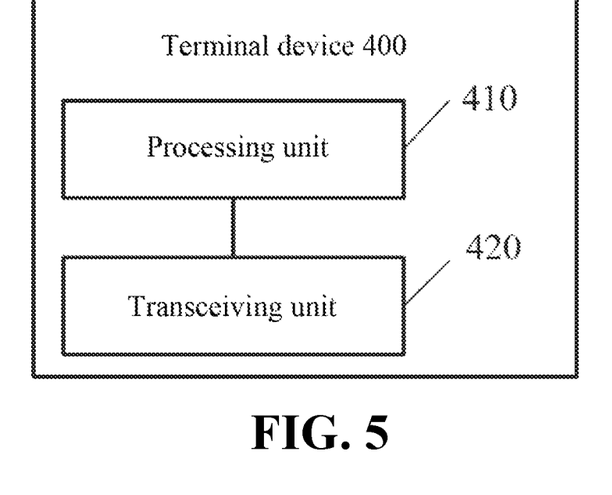
FIG. 5 is a schematic block diagram of a terminal device according to an implementation of the present disclosure.

FIG. 5 is a schematic block diagram of a terminal device 400 according to an implementation of the present disclosure. As shown in FIG. 5, the terminal device 400 includes a processing unit 410 and a transceiving unit 420.

The processing unit 410 is used for determining multiple transmitting beams from transmitting beams of a network device, and determining a receiving beam matched with each transmitting beam of the multiple transmitting beams in at least two receiving beam groups of the terminal device.

The transceiving unit 420 is used for transmitting a notification message to the network device, wherein the notification message is used for indicating multiple transmitting beams and the receiving beam matched with the each transmitting beam, and includes information to be used by the network device for distinguishing a receiving beam group to which the receiving beam matched with the each transmitting beam belongs and distinguishing the receiving beam matched with the transmitting beam in the receiving beam group.

Optionally, in the at least two receiving beam groups, different receiving beam groups correspond to different antenna panels of the terminal device.

Optionally, the notification message carries identification information of the receiving beam matched with the each transmitting beam, and the identification information of each receiving beam carried by the notification message is different from identification information of other receiving beams included in the at least two receiving beam groups, to be used by the network device for distinguishing the receiving beam group to which the receiving beam matched with the each transmitting beam belongs and distinguishing the receiving beam matched with the transmitting beam in the receiving beam group.

Optionally, the notification message carries identification information of the receiving beam group to which the receiving beam matched with the each transmitting beam belongs, and identification information of the receiving beam matched with the each transmitting beam in the receiving beam group to which the receiving beam belongs, to be used by the network device for distinguishing the receiving beam group to which the receiving beam matched with the each transmitting beam belongs and distinguishing the receiving beam matched with the transmitting beam in the receiving beam group.

Optionally, multiple transmitting beams includes multiple first transmitting beams, a receiving beam matched by the multiple first transmitting beams is a first receiving beam, and the first receiving beam is one receiving beam included in one of the at least two receiving beam groups.

The transceiving unit 420 is further used for: receiving downlink signals simultaneously transmitted by the network device through the multiple first transmitting beams, by using the first receiving beam.

Optionally, the transceiving unit 420 is further used for: receiving first indication information, wherein the first indication information is used for indicating that the network device will simultaneously transmit the downlink signals to the terminal device by using the multiple first transmitting beams.

Optionally, the receiving beams matched with the multiple transmitting beams are multiple receiving beams, and different receiving beams in the multiple receiving beams belong to different receiving beam groups.

The transceiving unit 420 is further used for: receiving simultaneously downlink signals simultaneously transmitted by the network device through the multiple transmitting beams, by using the multiple receiving beams.

Optionally, the transceiving unit 420 is further used for: receiving second indication information, wherein the second indication information is used for indicating that the network device will simultaneously transmit the downlink signals to the terminal device by using the multiple transmitting beams.

Optionally, the processing unit 410 is further used for: measuring downlink signals transmitted by at least part of the transmitting beams of the network device by using at least part of receiving beams of each of the at least two receiving beam groups to obtain a measurement result; and determining the multiple transmitting beams and the receiving beam matched with the each transmitting beam of the multiple transmitting beams in the at least two receiving beam groups according to the measurement result.

Optionally, the notification message further carries a measurement result of measuring, by the terminal device, a downlink measurement signal transmitted by the each transmitting beam by using the receiving beam matched with the each transmitting beam of the multiple transmitting beams.

It should be understood that the terminal device 400 may correspond to the terminal device in the method 200, and may implement corresponding functions implemented the terminal device in the method 200. For the sake of brevity, those will not be repeated here.

Figure 6:
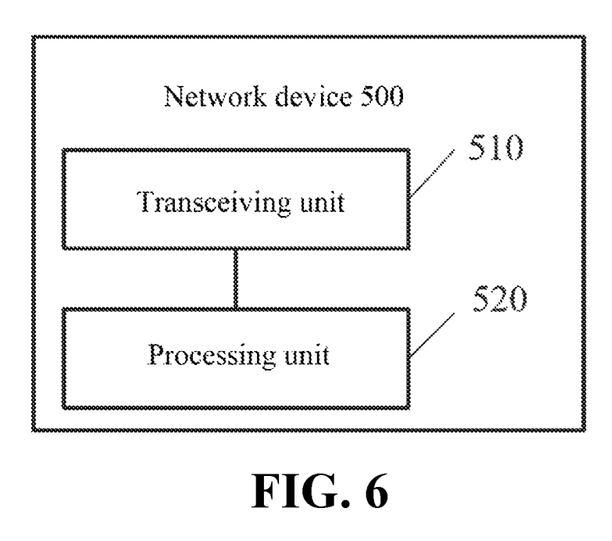
FIG. 6 is a schematic block diagram of a network device according to an implementation of the present disclosure.

FIG. 6 is a schematic block diagram of a network device 500 according to an implementation of the present disclosure. As shown in FIG. 6, the network device 500 includes a transceiving unit 510 and a processing unit 520.

The transceiving unit 510 is used for receiving a notification message transmitted by a terminal device, wherein the notification message is used for indicating multiple transmitting beams of the network device and a receiving beam matched with each transmitting beam of the multiple transmitting beams in at least two receiving beam groups of the terminal device, and the notification message includes information to be used by the network device for distinguishing a receiving beam group to which the receiving beam matched with the each transmitting beam belongs and distinguishing the receiving beam matched with the transmitting beam in the receiving beam group.

The processing unit 520 is used for determining the receiving beam matched with the each transmitting beam and determining the beam group to which the receiving beam matched with the each transmitting beam belongs according to the notification message; and determining multiple target transmitting beams from the multiple transmitting beams according to the receiving beam matched with the each transmitting beam and the beam group to which the receiving beam matched with the each transmitting beam belong.

The transceiving unit 510 is further used for transmitting simultaneously downlink signals to the terminal device by using the multiple target transmitting beams.

Optionally, different receiving beam groups of the terminal device correspond to different antenna panels of the terminal device.

Optionally, the notification message carries identification information of the receiving beam matched with the each transmitting beam, and the identification information of each receiving beam carried by the notification message is different from identification information of other receiving beams included in the at least two receiving beam groups.

The processing unit 520 is further used for: determining the receiving beam matched with the each transmitting beam and determining the beam group to which the receiving beam matched with the each transmitting beam belongs according to the identification information of the receiving beam matched with the each transmitting beam and preset information, wherein the preset information is used for indicating receiving beams included in the at least two receiving beam groups.

Optionally, the notification message carries identification information of the receiving beam group to which the receiving beam matched with the each transmitting beam belongs, and identification information of the receiving beam matched with the each transmitting beam in the receiving beam group to which the receiving beam belongs.

The processing unit 520 is further used for: determining the receiving beam matched with the each transmitting beam and determining the beam group to which the receiving beam matched with the each transmitting beam belongs according to the identification information of the receiving beam group to which the receiving beam matched with the each transmitting beam belongs and the identification information of the receiving beam matched with the each transmitting beam in the receiving beam group to which the receiving beam belongs.

Optionally, the multiple target transmitting beams are matched with multiple receiving beams, and different receiving beams in the multiple receiving beams belong to different receiving beam groups.

Optionally, the multiple transmitting beams include multiple first transmitting beams, a receiving beam matched with the multiple first transmitting beams is a first receiving beam, and the first receiving beam is one receiving beam included in one of the at least two receiving beam groups.

Optionally, the transceiving unit 510 is further used for: transmitting indication information to the terminal device, wherein the indication information is used for indicating that the network device will simultaneously transmit the downlink signals to the terminal device by using the multiple target transmitting beams.

Optionally, the notification message further carries a measurement result of measuring, by the terminal device, a downlink measurement signal transmitted by the each transmitting beam by using the receiving beam matched with the each transmitting beam of the multiple transmitting beams.

It should be understood that the network device 500 may correspond to the network device in the method 300, and may implement corresponding functions implemented the network device in the method 300. For the sake of brevity, those will not be repeated here.

Figure 7:
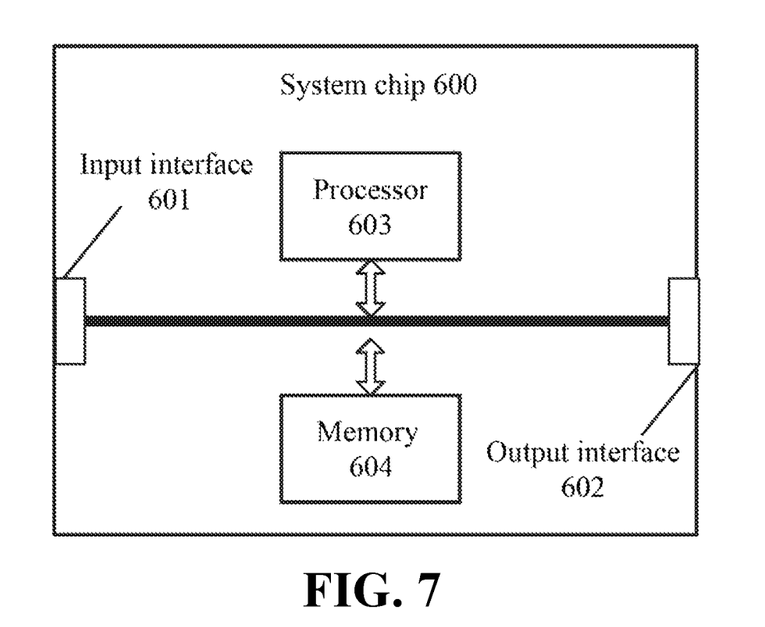
FIG. 7 is a schematic diagram of a system chip according to an implementation of the present disclosure.

FIG. 7 is a schematic structural diagram of a system chip 600 according to an implementation of the present disclosure. The system chip 600 of FIG. 7 includes an input interface 601, an output interface 602, a processor 603, and a memory 604. The input interface 601, the output interface 602, the processor 603, and the memory 604 are connected through internal communication connection lines. The processor 603 is used for executing codes in the memory 604.

Optionally, when the codes are executed, the processor 603 implements the method implemented by the terminal device in the method 200 shown in FIG. 2. For sake of conciseness, it will not be repeated here.

Optionally, when the codes are executed, the processor 603 implements the method implemented by the network device in the method 300 shown in FIG. 3. For sake of conciseness, it will not be repeated here.

Figure 8:
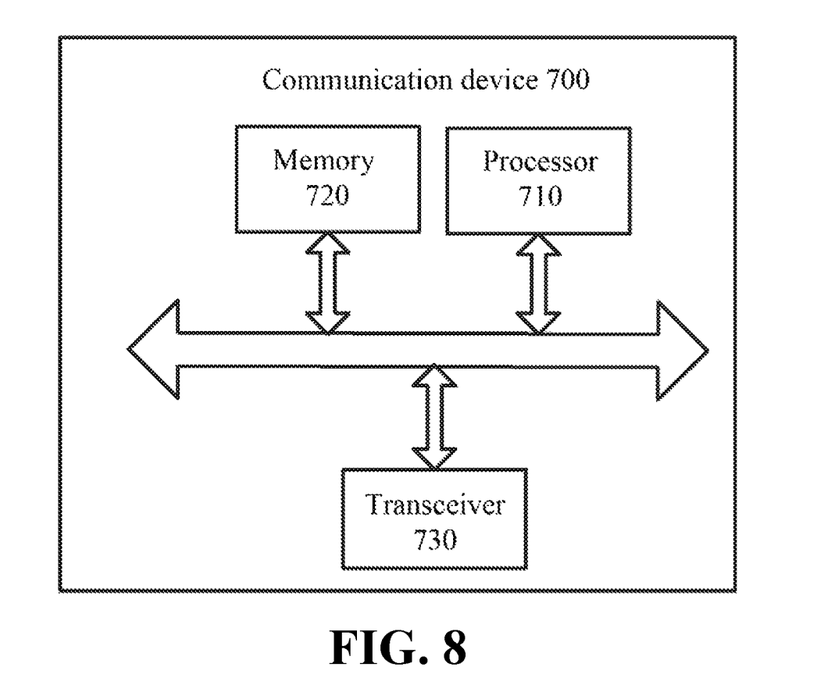
FIG. 8 is a schematic block diagram of a communication device according to an implementation of the present disclosure.

FIG. 8 is a schematic block diagram of a communication device 700 according to an implementation of the present disclosure. As shown in FIG. 8, the communication device 700 includes a processor 710 and a memory 720. The memory 720 may store program codes, and the processor 710 may execute the program codes stored in the memory 720.

Optionally, as shown in FIG. 8, the communication device 700 may include a transceiver 730, and the processor 710 may control the transceiver 730 to communicate externally.

Optionally, the processor 710 may invoke the program codes stored in the memory 720 to perform corresponding operations of the terminal device in the method 200 shown in FIG. 2, which will not be described here repeatedly for brevity.

Optionally, the processor 710 may invoke the program codes stored in the memory 720 to perform corresponding operations of the network device in the method 300 shown in FIG. 3, which will not be described here repeatedly for brevity.

Those of ordinary skill in the art will recognize that various exemplary units and algorithm acts described in connection with the implementations disclosed herein can be implemented in electronic hardware, or a combination of computer software and electronic hardware. Whether these functions are implemented in hardware or software depends on a specific application and design constraint of the technical solutions. Skilled in the art may use different methods to realize the described functions for each specific application, but such realization should not be considered to be beyond the scope of the present disclosure.

Those skilled in the art may clearly understand that for convenience and conciseness of description, the specific working processes of the systems, apparatuses and units described above may refer to the corresponding processes in the aforementioned method implementations, and details are not described herein again.

In several implementations provided by the present disclosure, it should be understood that the disclosed systems, apparatuses and methods may be implemented in other ways. The apparatus implementations described above are only illustrative, for example, the division of the units is only a logical function division, and there may be other division manners in actual realization. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the implementations.

In addition, various functional units in various implementations of the present disclosure may be integrated in one processing unit, or various units may be physically present separately, or two or more units may be integrated in one unit.

The function may be stored in a computer readable storage medium if implemented in a form of software functional unit and sold or used as a separate product. Based on this understanding, the technical solutions of the implementations of the present disclosure, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage medium include U disk, mobile hard disk, read-only memory (ROM), random access memory (RAM), magnetic disk or optical disk, and other medium capable of storing program codes.

The foregoing are merely exemplary implementations of the present disclosure, but the protection scope of the present disclosure is not limited thereto. Any person skilled in the art can easily conceive variations or substitutions within the technical scope disclosed by the present disclosure, which should be included within the protection scope of the present disclosure. Therefore, the protection scope of the present disclosure should be subject to the protection scope of the claims.

What is claimed is:

1. A method for wireless communication, comprising:
   receiving, by a network device, a notification message transmitted by a terminal device, wherein the notification message is used for indicating a plurality of transmitting beams of the network device and a receiving beam matched with each transmitting beam of the plurality of transmitting beams in at least two receiving beam groups of the terminal device, and the notification message comprises information to be used by the network device for distinguishing a receiving beam group to which the receiving beam matched with the each transmitting beam belongs and distinguishing the receiving beam matched with the transmitting beam in the receiving beam group;
   determining, by the network device, the receiving beam matched with the each transmitting beam and determining a receiving beam group to which the receiving beam matched with the each transmitting beam belongs according to the notification message;
   determining, by the network device, a plurality of target transmitting beams from the plurality of transmitting beams according to the receiving beam matched with the each transmitting beam and the receiving beam group to which the receiving beam matched with the each transmitting beam belongs; and transmitting simultaneously, by the network device, downlink signals to the terminal device by using the plurality of target transmitting beams, wherein the notification message further carries a measurement result of measuring, by the terminal device, a downlink measurement signal transmitted by the each transmitting beam by using the receiving beam matched with the each transmitting beam of the plurality of transmitting beams, and wherein the network device determines a target transmitting beam from the plurality of transmitting beams according to a congestion situation of the each transmitting beam, a data amount of downlink data to be transmitted, and a measurement result for measuring the downlink measurement signal transmitted by the each transmitting beam by a beam pair consisted of the each transmitting beam and the receiving beam matched with the each transmitting beam.

2. The method according to claim 1, wherein different receiving beam groups of the terminal device correspond to different antenna panels of the terminal device.

3. The method according to claim 1, wherein the notification message carries identification information of the receiving beam matched with the each transmitting beam, and the identification information of each receiving beam carried by the notification message is different from identification information of other receiving beams included in the at least two receiving beam groups; and determining, by the network device, the receiving beam matched with the each transmitting beam and determining the receiving beam group to which the receiving beam matched with the each transmitting beam belongs according to the notification message comprises:

determining, by the network device, the receiving beam matched with the each transmitting beam and determining the receiving beam group to which the receiving beam matched with the each transmitting beam belongs according to the identification information of the receiving beam matched with the each transmitting beam and preset information, wherein the preset information is used for indicating receiving beams included in the at least two receiving beam groups;

or, wherein the notification message carries identification information of the receiving beam group to which the receiving beam matched with the each transmitting beam belongs, and identification information of the receiving beam matched with the each transmitting beam in the receiving beam group to which the receiving beam belongs; and determining, by the network device, the receiving beam matched with the each transmitting beam and determining the receiving beam group to which the receiving beam matched with the each transmitting beam belongs according to the notification message; comprises:

determining, by the network device, the receiving beam matched with the each transmitting beam and determining the receiving beam group to which the receiving beam matched with the each transmitting beam belongs according to the identification information of the receiving beam group to which the receiving beam matched with the each transmitting beam belongs and the identification information of the receiving beam matched with the each transmitting beam in the receiving beam group to which the receiving beam belongs.

4. The method according to claim 1, wherein the plurality of target transmitting beams are matched with a plurality of receiving beams, and different receiving beams in the plurality of receiving beams belong to different receiving beam groups;

or, wherein the plurality of transmitting beams comprise a plurality of first transmitting beams, a receiving beam matched with the plurality of first transmitting beams is a first receiving beam, and the first receiving beam is one receiving beam included in one of the at least two receiving beam groups.

5. The method according to claim 1, wherein the method further comprises:

transmitting, by the network device, indication information to the terminal device, wherein the indication information is used for indicating that the network device will simultaneously transmit the downlink signals to the terminal device by using the plurality of target transmitting beams.

6. A terminal device comprising a processor and a transceiver; wherein, the processor is used for determining a plurality of transmitting beams from transmitting beams of a network device, and determining a receiving beam matched with each transmitting beam of the plurality of transmitting beams in at least two receiving beam groups of the terminal device;

the transceiver is used for transmitting a notification message to the network device, wherein the notification message is used for indicating the plurality of transmitting beams and the receiving beam matched with the each transmitting beam, and comprises information to be used by the network device for distinguishing a receiving beam group to which the receiving beam matched with the each transmitting beam belongs and distinguishing the receiving beam matched with the transmitting beam in the receiving beam group; and the processor is further used for:

measuring downlink measurement signals transmitted by at least part of the transmitting beams of the network device by using at least part of receiving beams of each of the at least two receiving beam groups to obtain a measurement result; and determining the plurality of transmitting beams and the receiving beam matched with the each transmitting beam of the plurality of transmitting beams in the at least two receiving beam groups according to the measurement result, wherein the processor randomly selects the plurality of transmitting beams from beams whose beam quality exceeds a threshold.

7. The terminal device according to claim 6, wherein in the at least two receiving beam groups, different receiving beam groups correspond to different antenna panels of the terminal device.

8. The terminal device according to claim 6, wherein the notification message carries identification information of the receiving beam matched with the each transmitting beam, and the identification information of each receiving beam carried by the notification message is different from identification information of other receiving beams included in the at least two receiving beam groups, to be used by the network device for distinguishing the receiving beam group to which the receiving beam matched with the each transmitting beam belongs and distinguishing the receiving beam matched with the transmitting beam in the receiving beam group;

or, wherein the notification message carries identification information of the receiving beam group to which the receiving beam matched with the each transmitting beam belongs, and identification information of the receiving beam matched with the each transmitting beam in the receiving beam group to which the receiving beam belongs, to be used by the network device for distinguishing the receiving beam group to which the receiving beam matched with the each transmitting beam belongs and distinguishing the receiving beam matched with the transmitting beam in the receiving beam group.

9. The terminal device according to claim 6, wherein the plurality of transmitting beams comprise a plurality of first transmitting beams, a receiving beam matched with the plurality of first transmitting beams is a first receiving beam, and the first receiving beam is one receiving beam included in one of the at least two receiving beam groups; and the transceiver is further used for:

receiving downlink signals simultaneously transmitted by the network device through the plurality of first transmitting beams, by using the first receiving beam.

10. The terminal device according to claim 9, wherein the transceiver is further used for:

receiving first indication information, wherein the first indication information is used for indicating that the network device will simultaneously transmit the downlink signals to the terminal device by using the plurality of first transmitting beams.

11. The terminal device according to claim 6, wherein receiving beams matched with the plurality of transmitting beams are a plurality of receiving beams, and different receiving beams in the plurality of receiving beams belong to different receiving beam groups; and the transceiver is further used for:

receiving simultaneously downlink signals simultaneously transmitted by the network device through the plurality of transmitting beams, by using the plurality of receiving beams.

12. The terminal device according to claim 11, wherein the transceiver is further used for:

receiving second indication information, wherein the second indication information is used for indicating that the network device will simultaneously transmit the downlink signals to the terminal device by using the plurality of transmitting beams.

13. The terminal device according to claim 6, wherein the notification message further carries a measurement result of measuring, by the terminal device, a downlink measurement signal transmitted by the each transmitting beam by using the receiving beam matched with the each transmitting beam of the plurality of transmitting beams.

14. A network device comprising a transceiver and a processor; wherein, the transceiver is used for receiving a notification message transmitted by a terminal device, wherein the notification message is used for indicating a plurality of transmitting beams of the network device and a receiving beam matched with each transmitting beam of the plurality of transmitting beams in at least two receiving beam groups of the terminal device, and the notification message comprises information to be used by the network device for distinguishing a receiving beam group to which the receiving beam matched with the each transmitting beam belongs and distinguishing the receiving beam matched with the transmitting beam in the receiving beam group;

the processor is used for determining the receiving beam matched with the each transmitting beam and determining a receiving beam group to which the receiving beam matched with the each transmitting beam belongs according to the notification message; and determining a plurality of target transmitting beams from the plurality of transmitting beams according to the receiving beam matched with the each transmitting beam and the receiving beam group to which the receiving beam matched with the each transmitting beam belongs;

the transceiver is further used for transmitting simultaneously downlink signals to the terminal device by using the plurality of target transmitting beams, wherein the notification message further carries a measurement result of measuring, by the terminal device, a downlink measurement signal transmitted by the each transmitting beam by using the receiving beam matched with the each transmitting beam of the plurality of transmitting beams; and the processor is further used for determining a target transmitting beam from the plurality of transmitting beams according to a congestion situation of the each transmitting beam, a data amount of downlink data to be transmitted, and a measurement result for measuring the downlink measurement signal transmitted by the each transmitting beam by a beam pair consisted of the each transmitting beam and the receiving beam matched with the each transmitting beam.

15. The network device according to claim 14, wherein different receiving beam groups of the terminal device correspond to different antenna panels of the terminal device.

16. The network device according to claim 14, wherein the notification message carries identification information of the receiving beam matched with the each transmitting beam, and the identification information of each receiving beam carried by the notification message is different from identification information of other receiving beams included in the at least two receiving beam groups; and wherein the processor is further used for:

determining the receiving beam matched with the each transmitting beam and determining the receiving beam group to which the receiving beam matched with the each transmitting beam belongs according to the identification information of the receiving beam matched with the each transmitting beam and preset information, wherein the preset information is used for indicating receiving beams included in the at least two receiving beam groups;

or, wherein the notification message carries identification information of the receiving beam group to which the receiving beam matched with the each transmitting beam belongs, and identification information of the receiving beam matched with the each transmitting beam in the receiving beam group to which the receiving beam belongs; and wherein the processor is further used for:

determining the receiving beam matched with the each transmitting beam and determining the receiving beam group to which the receiving beam matched with the each transmitting beam belongs according to the identification information of the receiving beam group to which the receiving beam matched with the each transmitting beam belongs and the identification information of the receiving beam matched with the each transmitting beam in the receiving beam group to which the receiving beam belongs.

17. The network device according to claim 14, wherein the plurality of target transmitting beams are matched with a plurality of receiving beams, and different receiving beams in the plurality of receiving beams belong to different receiving beam groups;
or,
wherein the plurality of transmitting beams comprise a plurality of first transmitting beams, a receiving beam matched with the plurality of first transmitting beams is a first receiving beam, and the first receiving beam is one receiving beam included in one of the at least two receiving beam groups.

18. The network device according to claim 14, wherein the processor is further used for:
transmitting indication information to the terminal device, wherein the indication information is used for indicating that the network device will simultaneously transmit the downlink signals to the terminal device by using the plurality of target transmitting beams.

* * * * *